United States Patent [19]
Baker, Jr.

[11] Patent Number: 5,209,257
[45] Date of Patent: May 11, 1993

[54] SEWER RELIEF VALVE

[76] Inventor: Clarence E. Baker, Jr., 1603 Old Mill Rd., Germantown, Tenn. 38138

[21] Appl. No.: 877,708

[22] Filed: May 4, 1992

[51] Int. Cl.⁵ .......... E03F 5/08; F16K 31/22; F16K 33/00
[52] U.S. Cl. .................. 137/315; 137/192; 137/202; 137/244; 137/357; 137/433; 137/533.31; 4/211; 4/219; 4/295; 4/669; 4/689; 4/DIG. 7
[58] Field of Search ............. 4/211, 219, 669, 671, 4/674, 689, 293, 295, DIG. 7; 137/202, 244, 356, 357, 430, 433, 533, 315, 192, 17, 533.17, 533.31

[56] References Cited

U.S. PATENT DOCUMENTS

| | | | |
|---|---|---|---|
| 3,161,206 | 12/1964 | Grundmann | 137/433 |
| 3,603,340 | 9/1971 | Rousselet | 137/357 |
| 3,805,826 | 4/1974 | Westerhoff | 137/533 |
| 3,815,629 | 6/1974 | Oberholtzer | 4/211 |
| 3,852,836 | 12/1974 | Oberholtzer | 4/219 |
| 4,114,641 | 9/1978 | Robinson et al. | 137/430 |
| 4,475,571 | 10/1984 | Houston, Jr. et al. | 4/211 |
| 4,850,059 | 7/1989 | Dickerson | 4/219 |
| 5,031,659 | 7/1991 | Gonzales et al. | 4/211 |

Primary Examiner—George L. Walton
Attorney, Agent, or Firm—Joseph T. Kivlin, Jr.

[57] ABSTRACT

A vent for relieving pressure in a sewage collection system for buildings characterized by a buoyant float-closure which will easily open in response to fluid pressure to permit escape of gas or liquid from the system upon the build-up in the system of minimum pressure in excess of atmospheric pressure. The float closure is mounted in a threaded plug which is adapted to replace the conventional clean-out plug on the exterior of the building.

2 Claims, 3 Drawing Sheets

SEWER RELIEF VALVE

This invention relates to a valve for relieving, to the exterior of a building, any pressure which accumulates in the building's sewer system, thereby causing wastewater to back up into plumbing fixtures located in the basement or lowest level of the building, such as floor drains, bathtubs or toilets, often resulting in substantial damage and unsanitary conditions.

BACKGROUND OF THE INVENTION

Gravity waste water collection systems have been used for generations in buildings, including public and private buildings and family residences. The force of gravity carries the waste water from buildings through lateral pipes into a sewer main located at a level lower than the lowest fixture in the building. The main, which serves multiple buildings or residences is usually located in a street or common access way. Over a period of time, the main may become partially blocked due to the growth of roots therein, or due to the presence of other foreign objects. It then becomes over filled in the event of heavy use or increased blockage, causing the waste water to back up through the lateral into the building, usually into the lowest fixture thereof.

There is normally provided a clean-out pipe, to enable laterals extending from the building to the main, to be cleared of any blockage such as tree roots or other foreign matter impeding the flow of wastewater in said lateral. It is also conventional in such systems, to provide a trap at each of the fixtures in the building, to prevent noxious odors from entering the residence from the lateral or main. It is also conventional to provide a vent to carry such odors out of the residence. The vent pipe or stack usually exits the residence through the roof thereof. The clean-out pipe is usually disposed vertically, has interior threads at its upper extremity, and is closed by an exteriorly threaded plug which can be removed by an ordinary wrench.

A number of patents have issued in recent years which propose to solve the back-up problem referred to. For example Rousselet, U.S. Pat. No. 3,603,340, issued in 1971, discloses a drain relief valve wherein the patentee utilizes a "one way" valve or check valve, consisting of a ball and cage to close a drain pipe extending outside of the dwelling. It appears that the valve is not located in a clean-out pipe, like the present invention. Rather it is apparently intended to prevent the backup of wastewater from the outside into the building.

The Westerhoff patent, U.S. Pat. No. 3,805,826 issued ion Apr. 23, 1974 discloses a similar arrangement, except that it contemplates a vertical clean-out pipe connected to a sewer lateral, with a closure mounted at the upper extremity of said clean-out. The Westerhoff closure consists of a relatively loose-fitting slide having a cylindrical shape and having large openings on the side thereof, which is held captive on the outside of the vertical clean-out pipe.

The Robinson patent, U.S. Pat. No. 4,114,641 and the Houston patent U.S. Pat. No. 4,475,571 show relatively more complicated devices to accomplish the same objective as contemplated by the present invention. Both patents disclose the use of a ball flotation element to open the clean-out pipe in a construction which is otherwise very dissimilar to the present invention. Neither patent provides for a closure which can reclose and reseal itself after opening for relief of minor buildup of pressure, or permit the introduction of the conventional tools necessary to remove an obstruction in the lateral.

By far the most relevant patent in this area is that issued to Oberholzer on Dec. 10, 1974, U.S. Pat. No. 3,852,836. It discloses a relief vent which is adapted to be used to close the upper end of a clean-out line, and is shown in the drawings to be disposed flush with the ground level. It utilizes what appears to be a solid member which may be forced out of the opening due to back pressure. However, it has only one gas or odor seal when in the closed position, and that is of such a configuration as to be easily fouled by debris which may be "burped" by the system. Moreover, the solid member is carried in a fitting which can be removed from the clean-out only by means of a specially designed tool not normally carried in the equipment used by a plumber or sewer worker.

The present invention utilizes an assembly to replace the closure normally used in a vertical clean-out pipe, said assembly having a closure which is adapted to be easily forced from the end of the clean-out pipe with minimum pressure. The closure is adapted to be readily inserted by hand and readily removable without special tools, and yet is tamper proof, in the sense that children or vandals would not easily disturb the same. The invention also incorporates a multiple seal to prevent malodorous gases from escaping from the system.

BRIEF DESCRIPTION OF THE DRAWINGS

Other advantages and features of the invention will become readily apparent upon reviewing the appended claims and the attached drawings, wherein:

DETAILED DESCRIPTION

Figure 1:
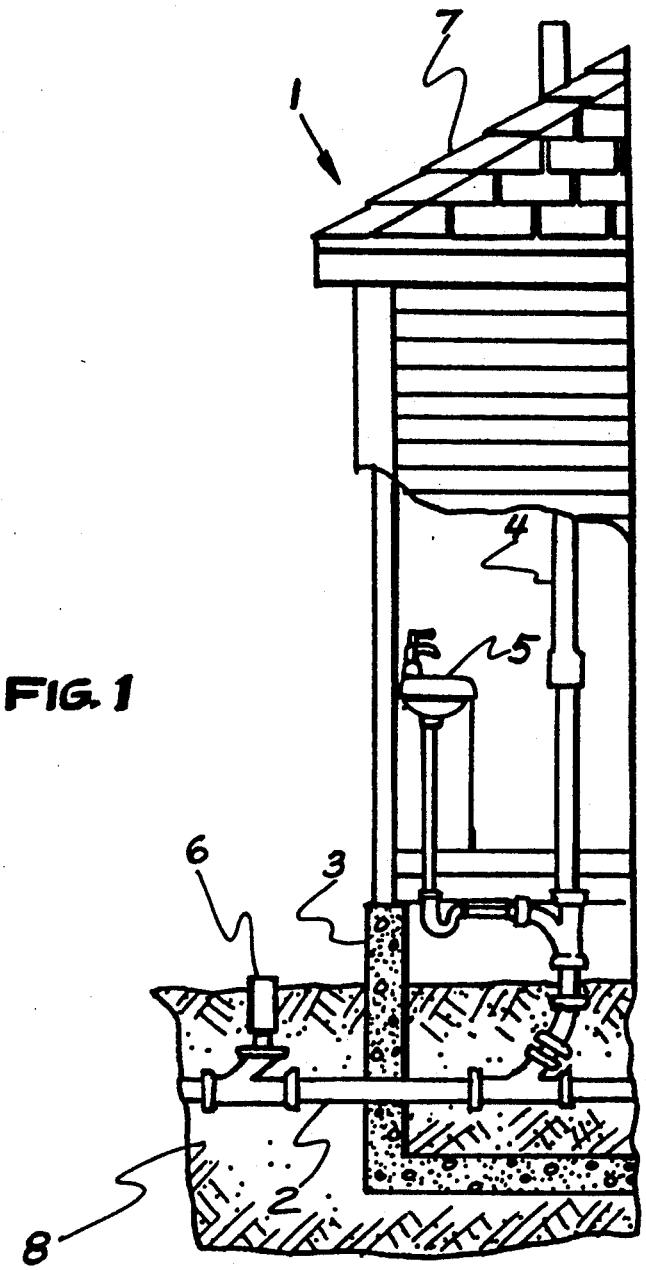
FIG. 1 is a plan view, partially in section, of a portion of a plumbing system for a building, which could employ the present invention.
Figure 2:
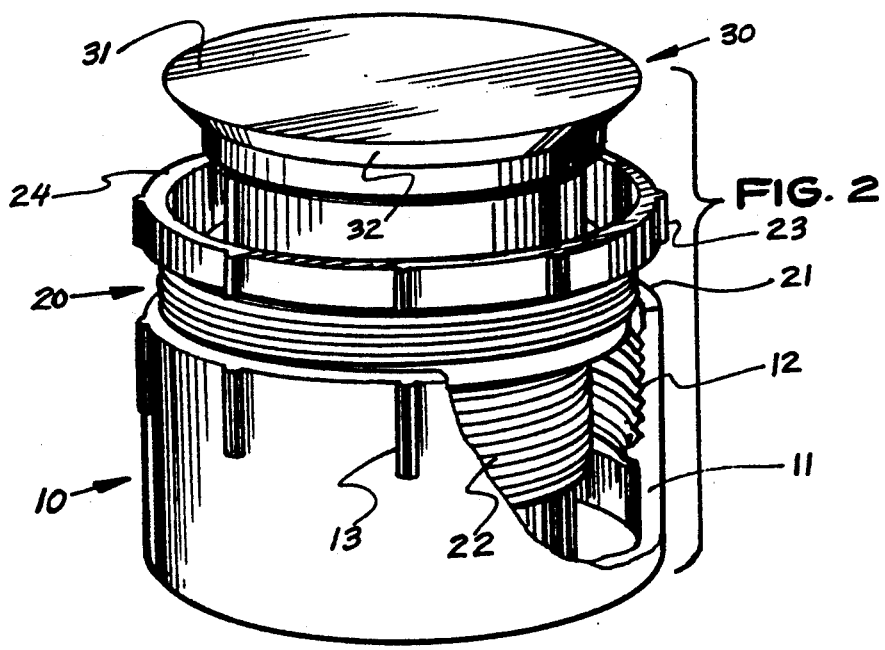
FIG. 2 shows the present invention in a perspective view, partially assembled and partially in section.
Figure 3:
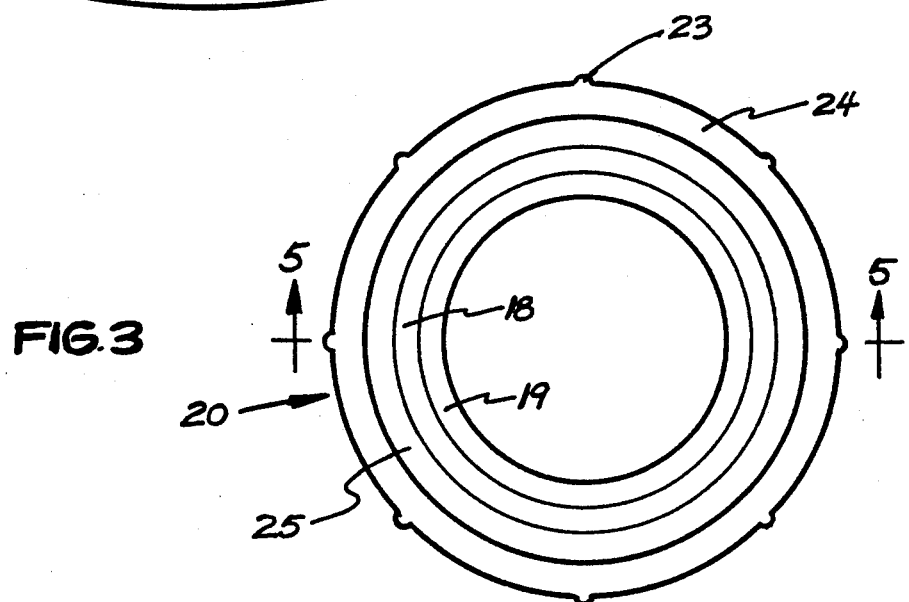
FIG. 3 is a top elevation of the threaded plug employed in the assembly of this invention.

Referring now in more detail to the drawings, FIG. 1 depicts a building 1, which has no basement, with a sewer lateral 2, extending through its foundation 3 below the surface of the ground 8, a vent stack 4 extending through its roof 7, a plumbing fixture, in this case, a sink, shown at 5, on the lowest level of the building, and a vertical clean-out pipe 6, extending from the lateral through the surface of the ground 8 outside of the foundation. FIG. 2 shows one embodiment of the improved relief valve of the present invention, for mounting at the upper extremity of a vertical clean-out pipe, such as that shown generally at 6 in FIG. 1. The assembly consists of collar 10, plug 20, and closure-float 30. Collar 10 is provided with internal threads 12 for receiving the plug and with lugs 13, the latter being adapted to provide for a grip either manually or by means of a pipe wrench.

In another embodiment, the use of collar 10 is not necessary if the vertical clean-out pipe has the proper diameter and threads to engage plug 20. If it is not so equipped, then collar 10 can be attached to the vertical pipe by conventional means, such as by glueing, if plastic pipe is used or, in the case of metal pipe, by means of a flexible collar secured thereto with a conventional screw clamp.

Clean-out pipe 6, is normally threaded internally and is conventionally fitted with a threaded closure plug, not shown, which is removable with an ordinary wrench. Such closure plug can be easily replaced by the plug-assembly shown in FIGS. 2 and 4, assuming it has a diameter and thread corresponding to one of those provided on plug 20 of the assembly.

Figure 4:
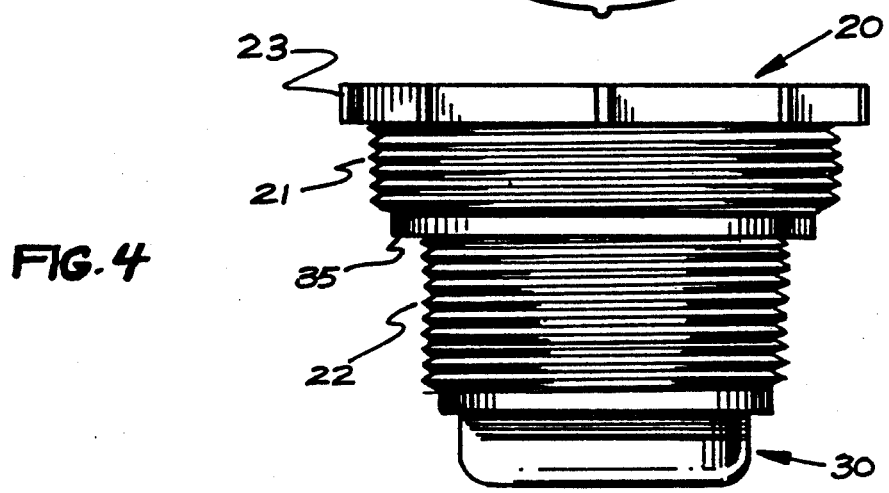
FIG. 4 is a side elevation, showing the assembly with its closure mounted in the threaded plug, the latter having threads for two different diameter pipes.

As shown in FIG. 4, plug 20 has exterior threads 21 and 22 which are adapted to engage the interior threads of standpipe 6 (or threads 12 of collar 10), when the plug is rotated by hand in a clockwise direction. The two sets of threads 21 and 22 of plug 20 are provided so that it can be mounted in stand-pipes of the two most common diameters. Plug 20 is also provided with a series of lugs 23 to faciliate tightening said plug in standpipe 6 or collar 10.

Plug 20 contains several cylindrical openings concentric with the exterior thereof. At its upper extremity, plug 20 has its central opening beveled outwardly at 25, and its concentric openings are shown 27, 28 and 29, with three diameters, of vertically descending reduced dimensions, to provide shoulders 18 and 19, for supporting closure-float 30 and for forming a gas seal.

Figure 6:
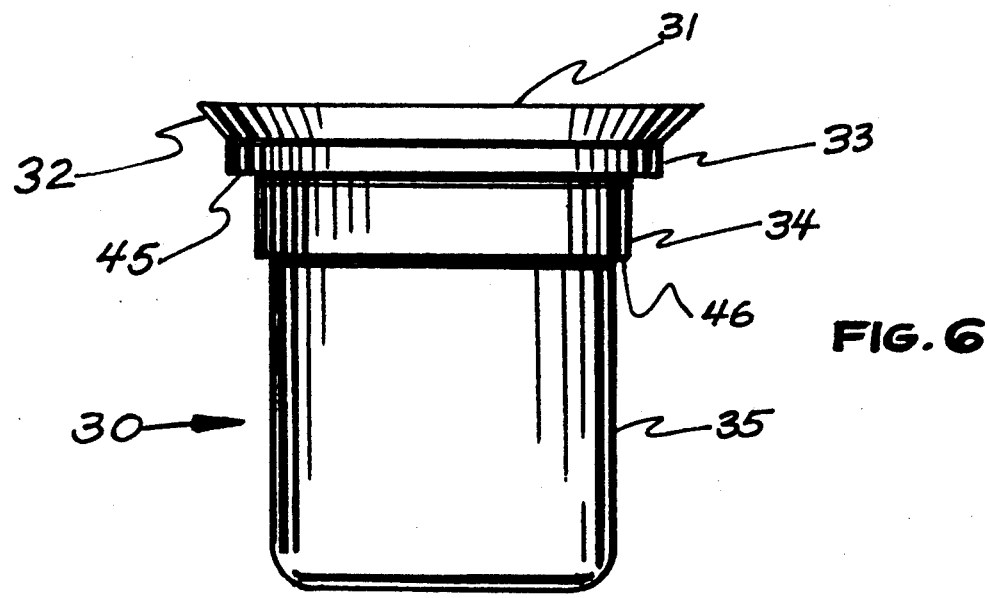
FIG. 6 is a side elevation showing the float-closure by itself.

As best seen in FIG. 6, float-closure 30 is provided with a flat upper surface 31, which, at its periphery, extends inwardly by means of bevel 32, to cylinder 33. Cylinders 33, 34 and 35 have diameters somewhat smaller respectively than diameters of cylinders 27, 28 and 29 of plug 20. Bevel 32 of the float/closure is disposed at an angle corresponding to that of the flared opening at 25 at the upper end of plug 20. The two diameters 33 and 34 meet at shoulder 45 which is located axially the same distance from top 31 of the float-closure as shoulder 26 is from top 24 of plug 20. Similarly, diameters 34 and 35 form shoulder 46 which is equidistant from top surface 31 of float 30 as is reduced shoulder 23 from top 24.

Figure 5:
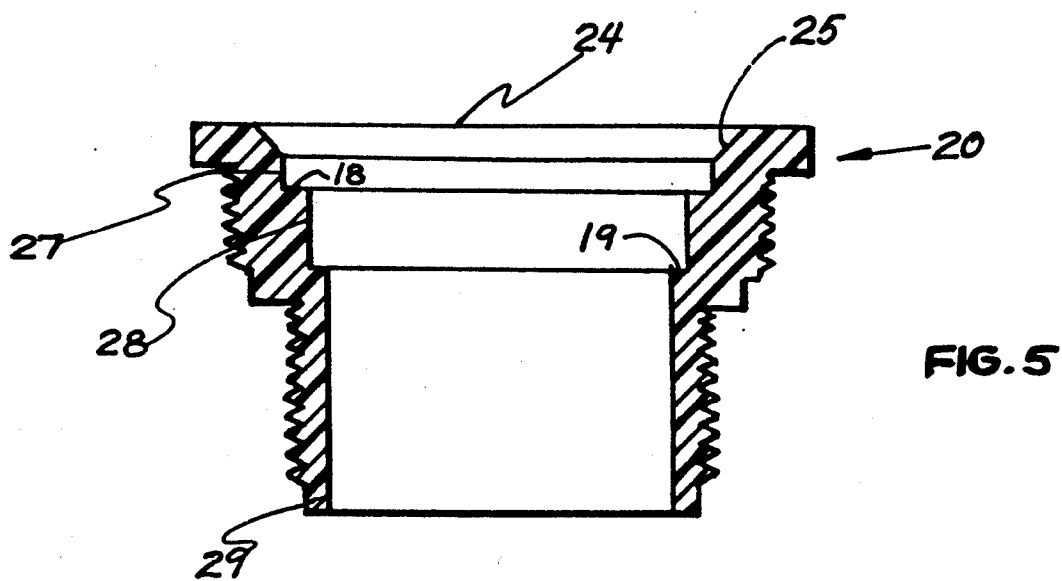
FIG. 5 is a cross section of the threaded plug, taken along the line 5—5 in FIG. 3.

Float-closure 30 is shown in FIG. 5 to be a hollow structure. A solid closure would be operable provided that it has a sufficiently small mass. Optimally it should have a specific gravity of less than one so that it will be easily floated out of the plug by the buoyancy of water, or by the least possible gas pressure, not discharged through the vent stack 4.

In operation, plug 20 can be installed by hand in the clean-out pipe, or in the alternative collar mounted on said clean-out pipe. Plug 20 preferably should be tightened as much as possible with two hands to prevent removal thereof by children or the idle. The flat top 31 of float-closure 30, as shown in FIG. 4, is flush with the top surface 24 of plug 20. Float-closure 30 should be made to fit loosely in plug 20 except at shoulders 45 and 46 where it meets supporting shoulders 18 and 19 respectively of plug 20, and except at the location where beveled surface 25 meets flared portion 32 of plug 20.

In such an arrangement diameter 35 of the float-closure serves merely as a guide within the smallest diameter 29 of plug 20, so that upon any increase in the back pressure of the system not carried away by the vent stack pipe 4, the relatively light weight closure will rise and break the odor seals at the three concentric locations, the two shoulders and the beveled surfaces. Thus the axis of the float-closure 30 should be substantially longer at its smallest diameter 35 than the length of plug 20 at its smallest diameter 29. With such an arrangement, the float-closure will properly reseat itself in the event it is forced open by minor gas pressure. It should be noted that the three odor seals referred to also provide support for any substantial weight which may rest on the top 31 of the float-closure.

Removal of the threaded plug from the end of the clean-out pipe can be accomplished manually by an adult, assuming hand tightening, to permit the introduction of sewer cleaning cables with large cutting blades into the lines for removal of roots and other obstructions, which might be found in the lateral. Yet this design for the float-closure plug makes it less vulnerable to removal by the idle or by children, and enables it to be opened easily by the force of back pressure. The flush upper surface thereof enables the assembly to be mounted flush with the ground or with pavement, and yet enable it to carry such weight as would ordinarily be brought to bear thereupon.

The materials employed for the structure of the present invention should be the same as those which are conventional at present in the plumbing trade, including but not limited to chlorinated polyvinyl chloride.

It should be understood that the foregoing disclosure relates to the preferred embodiment of the present invention and that various modifications or alternatives may be made without departing from the spirit of the invention as set forth in the appended claims.

I claim:

1. A manually removable sewer relief valve comprising:
    a. A cylindrical plug having manual gripping means at its upper periphery for easy removal, a threaded exterior below said gripping means having threads or different diameters for use in different size openings, and a concentric cylindrical opening therethrough, said opening being tapered outwardly at its upper extremity and having at least two interior diameters joined by a load-bearing shoulder perpendicular to the axis of said plug; and
    b. A cylindrical float for closing said opening, with surfaces which complement the interior surfaces of said plug, said float having at least two diameters and an outward taper corresponding to the diameters and taper of said opening, said diameters being joined by a shoulder for sealing and load-bearing engagement with corresponding shoulder in said plug, and having a specific gravity less than 1, whereby said float being displaceable from said plug manually as well as by fluid pressure; said float being composed of polyvinyl chloride, a chlorinated polyvinyl chloride, or other rigid inert plastic.

2. The sewer relief valve of claim 1 wherein said plug has exterior multiple diminishing diameters extending step-wise inwardly and downwardly, the uppermost diameter having gripping lugs on its surface, and the remaining diameters being threaded to correspond to internal threaded diameters of conventional clean-out pipes.

* * * * *